Oct. 7, 1952  B. CASTIGLIA  2,612,703
TURN GAUGE
Filed Oct. 1, 1947
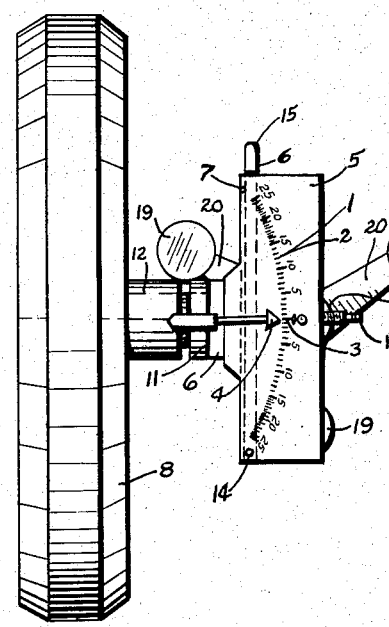
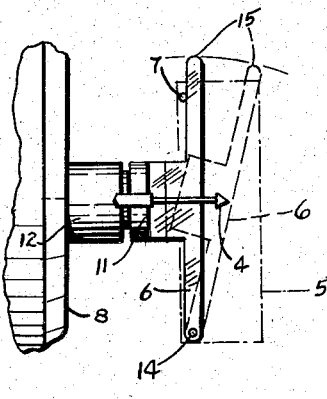
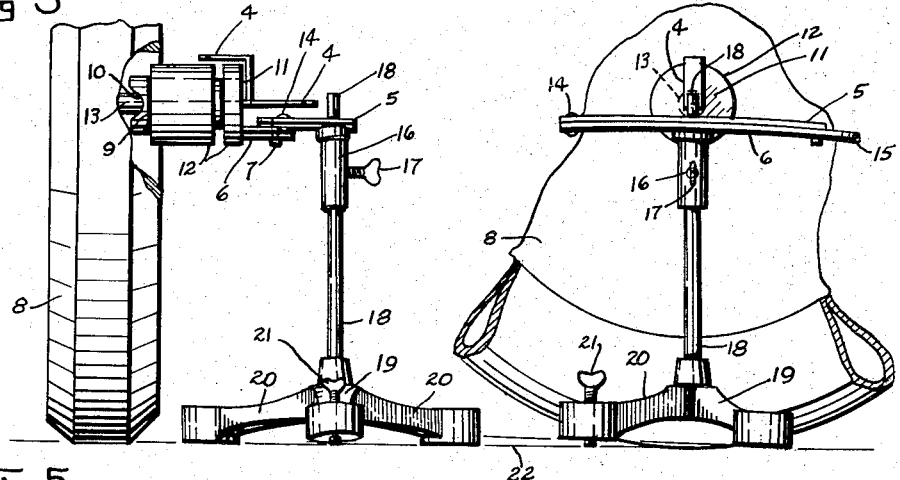
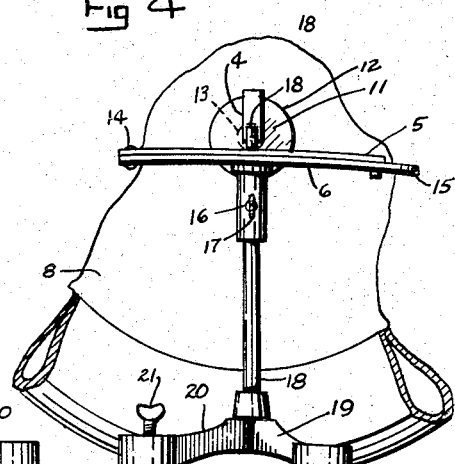
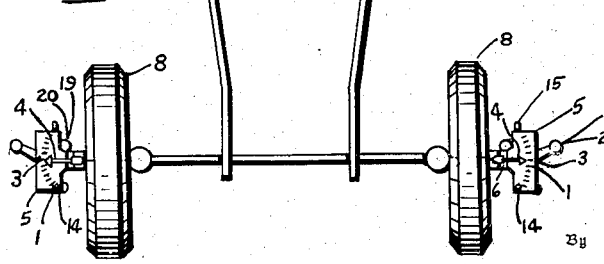
BIAGIS CASTIGLIA Inventor
Paul A. Talbot.
By
Attorney Patented Oct. 7, 1952

2,612,703

UNITED STATES PATENT OFFICE 2,612,703

TURN GAUGE

Biagis Castiglia, New York, N. Y., assignor to Wheel Aligning Necessities, Inc., New York, N. Y., a corporation of New York Application October 1, 1947, Serial No. 777,287

9 Claims. (Cl. 33—203.15)

1

My invention relates to a turn gauge particularly adapted to indicate the amount the front wheels of a vehicle are turned either to the right or left of the center or straight ahead.

Among the purposes and objects is to provide a pair of gauges, one for each side, to show the degrees from center each of the front wheels is turned.

Another object is to provide a turn gauge which is easily set to accurately determine the center position.

An object is to provide a gauge which is a self contained unit and which is aligned by placing the unit at zero and against the hub of the wheel or an extension to the hub or axle spindle.

Still another object is to provide a pair of turn gauge units, one for each side, to determine the center position of each wheel and also to determine the angular turn of each wheel from the center position to show the difference in the angular turn of the inside as well as the outside angular position of each wheel as when steering the vehicle to the left or right.

An object is to provide a turn gauge which is easily adjusted for the caster of the wheel mounting as well as for wheels having a difference in diameter.

Another object is to provide a movable aligning means which may be easily moved out of position to permit the wheel to be turned after aligning the gauge.

I accomplish these and other objects by the construction herein described and shown in the drawing which forms a part of this my disclosure.

In the drawing:

Fig. 1 is a plan view of my gauge as applied to the left front wheel of the vehicle.

Fig. 2 is a fragmentary plan view showing the aligning member in place in full lines and as swung to one side in broken lines to permit the wheel to be swung in either direction from the center position.

Fig. 3 is a front elevational view of the left turn indicator unit looking toward the rear of the vehicle.

Fig. 4 is a side elevational view of one of my turn gauges when applied to the left front wheel.

Fig. 5 is a diagrammatic view showing the application of a pair of my turn gauges.

Similar reference characters refer to similar parts throughout the several views of the drawings and in the specifications.

Turn gauges generally require considerable adjustment to determine the center position and depend on being secured to other gauges, turntables or the vehicle. In my improvement the gauge for each side front wheel is merely set on the floor and aligned by placing the movable aligning member against any face in line with the end of the hub of the wheel or by placing the aligning member in abutment with an extension or gauge having a face in parallelism with the hub face; the wheel gauge shown having a center pointer, the gauge shown is set at zero degrees with the pointer; the aligning member is moved to one side to permit the wheel to turn to the left or right to the degrees shown on the indicator which at once shows the difference in degrees the wheel is turned such as for the wheel on the inside of the turn or the outside. The inside wheel turns 20 degrees, for instance, while the outside wheel turns 17 degrees when properly adjusted. Thus, when the pointer on the wheel is swung rearward with respect to the vehicle the wheel on the inside of the turn is moved to 20 degrees and when swung forward the same wheel is on the outside of the turn and swung 17 degrees.

By placing one of my gauges on the floor at each side front wheel the pair of gauges show at a glance the true state of the adjustment of both wheels in relation to each other.

The caster may be compensated for by tilting the gauge so that the pointer follows the indicator face at substantially the same distance from the indicator's face when the wheel is turned at either extreme from the center position.

The pair of gauges may be made right and left.

In this disclosure I have not attempted to describe all possible modifications of my turn gauge but rather have described, in detail, a preferred construction which embodies the principles which underlie my invention so that one skilled in the art to which this invention pertains may more readily follow and understand the construction.

Modifications may suggest themselves after a study of this disclosure.

The preciseness of the detailed specifications to follow and the preciseness of the drawing are not intended to limit the scope of my invention which is set forth in the appended claims.

Referring to the drawing I have shown an indicator scale 1 having indicia 2 giving the degrees to the front and rear of the zero or center position 3 to which the pointer 4 may be set as contrasted with the center position as when the vehicle is steered straight ahead.

Movably secured to the table 5, to which the indicator scale 1 is secured or with which it is formed integral, I have provided the aligning member 6 which is placed against the stop 7, thereby insuring the setting of the indicator to be true and in alignment with the wheel 8, or the faced end 9 of its hub 10, when the aligning member is placed against it or against the face 11 of a camber, caster or similar gauge 12 which has a faced end parallel to the plane of the faced end of the hub.

The gauge 12 is provided with a pointer 4 which is parallel to the axis of the axle spindle of the wheel 13, Figs. 3 and 4. The pointer is set at zero when the wheel is at its center or straight ahead position and may be swung with the wheel along the face of the indicator to the indicia designating the degrees after moving the aligning member out of the way or away from the face to which it was placed to align my gauge with the wheel.

The aligning member is a swingable lever pivoted at 14 and having a handle 15 extending beyond the table; the broken lines in Fig. 2 of the drawing show the position of the aligning member when swung out of its aligning position, which is shown by the full lines. The outline of the table is shown in dots and dashes.

The table is preferably secured to the slidable sleeve 16 which is provided with the thumb screw 17 to secure the table at the desired position in relation to the pointer by sliding the sleeve vertically on the stanchion 18 which thus supports the table at the desired height. The lower end of the stanchion is secured to the base 19 preferably having three legs 20, one of which is provided with the thumb screw 21 to provide a means for tilting the base and table to compensate for the caster mounting of the wheel as well as any irregularities which may characterize the floor 22 on which the base rests.

In Fig. 5 I have shown a diagram of the front wheels of a vehicle to which a pair of my gauges are aligned to determine the relative angular turn of both wheels, at a glance, simultaneously.

The base is preferably made heavy and to cover a substantial floor area to prevent accidental movement on the floor on which it rests.

The material and size of the parts may vary to suit the type and size of the vehicle. A single gauge however may serve to measure the turn angle of the wheels of most vehicles such as automobiles.

Having thus described a preferred embodiment of my invention what I claim as new and desire to secure by Letters Patent is set forth in the following claims.

I claim:

1. In a turn gauge for vehicle wheels having an axle spindle and a wheel hub having an end faced at substantially ninety degrees to the axis of said axle spindle, a pointer extending beyond the free end of said axle spindle, a table, and an indicator scale on said table having indicia showing the degrees said axle spindle is turned at each side of the center position as shown by said pointer and indicia, and an aligning member movably secured to said table and indicator scale and movable away from abutting said hub end after aligning said indicator scale with said hub end to permit said wheel to turn.

2. In a turn gauge for vehicle wheels having an axle spindle and a wheel hub having an end faced at substantially ninety degrees to the axis of said axle spindle, a pointer extending beyond the free end of said axle spindle, a table, an indicator scale on said table having indicia showing the degrees said axle spindle is turned at each side of the center position as shown by said pointer and indicia, and an aligning member movably secured to said table and indicator scale and movable away from abutting said hub end after aligning said indicator scale with said hub end to permit said wheel to turn and means secured to said table to position said aligning member with respect to said indicator scale.

3. In a turn gauge for vehicle wheels having an axle spindle and a wheel hub having an end faced at substantially ninety degrees to the axis of said axle spindle, a pointer extending beyond the free end of said axle spindle, a table, an indicator scale on said table having indicia showing the degrees said axle spindle is turned at each side of the center position as shown by said pointer and indicia, and an aligning member movably secured to said table and indicator scale and movable away from abutting said hub end after aligning said indicator scale with said hub end to permit said wheel to turn, and a stanchion for supporting said scale and table, and means adjustably securing said table to said stanchion, whereby said table and indicator scale may be raised or lowered.

4. In a turn gauge for vehicle wheels having an axle spindle and a wheel hub having an end faced at substantially ninety degrees to the axis of said axle spindle, a pointer extending beyond the free end of said axle spindle, a table, an indicator scale on said table having indicia showing the degrees said axle spindle is turned at each side of the center position as shown by said pointer and indicia, and an aligning member movable in relation to said table, indicator scale and said hub after aligning said indicator scale with said hub end to permit said wheel to turn, a base, and means supporting said table and indicator scale from said base.

5. In a turn gauge for vehicle front wheels having a pointer secured to the free end of the axle spindle, means abutting the wheel hub end for aligning said turn gauge in parallelism with the end face of the wheel hub, an indicator scale having indicia thereon to cooperate with said pointer to show the degrees the pointer is turned forward or rearward from the center position on said indicator scale, and means for moving said aligning means away from said hub end independent of said indicator scale to permit the wheel and pointer to be swung as when turning.

6. In a turn gauge for vehicle front wheels having a pointer secured to the free end of the axle spindle, means abutting the wheel hub end for aligning said turn gauge in parallelism with the end face of the wheel hub, an indicator scale having indicia thereon to cooperate with said pointer to show the degrees the pointer is turned forward or rearward from the center position on said indicator scale, and means for moving said aligning means away from said hub end independent of said indicator scale to permit the wheel and pointer to be swung as when turning, and a stop secured to said indicator scale for positioning said aligning means and said indicator scale, whereby they may be moved in parallelism with the end face of the hub.

7. In a turn gauge for vehicle front wheels having a pointer secured to the free end of the axle spindle for movement in a generally horizontal plane when the wheel is turned, means abutting the wheel hub end for aligning said turn gauge in parallelism with the end face of the wheel hub, a base for supporting said turn gauge, a stanchion on said base and generally upright with respect to said base, a sleeve slidably mounted on said stanchion, and a table having an indicator scale thereon, said table being mounted on said sleeve with the plane of said table perpendicular to the longitudinal axis of said sleeve and with said table and indicator scale in a plane generally parallel with the plane of travel of said pointer, said aligning means being connected to said table.

8. In a turn gauge for vehicle wheels having an axle spindle and a wheel hub having an end faced at substantially ninety degrees to the axis of said axle spindle, a pointer extending beyond the free end of said axle spindle, a table, and an indicator scale thereon having indicia showing the degrees said axle spindle is turned at each side of the center position as shown by said pointer and indicia, and an aligning member swingingly secured to said table and indicator scale and movable away from said hub end after aligning said indicator scale with said hub end to permit said wheel to turn.

9. In a gauge for aligning vehicle wheels having a hub end faced on a plane perpendicular to the axis of rotation of the wheel, a pointer, and a table and scale thereon having indicia for determining the degrees the wheel is turned on its king pin, said pointer being held in abutting relationship to said faced hub end, and an aligning member movable in relation to and for setting said table and scale in relation to said faced hub end.

BIAGIS CASTIGLIA.

REFERENCES CITED

The following references are of record in the file of this patent:

UNITED STATES PATENTS

| Number | Name | Date |
|---|---|---|
| 1,622,342 | Prather | Mar. 29, 1927 |
| 1,641,243 | Wochner | Sept. 6, 1927 |
| 1,927,488 | Christensen et al. | Sept. 19, 1933 |
| 2,176,357 | Palmer | Oct. 17, 1939 |
| 2,190,709 | Friestedt | Feb. 20, 1940 |